May 16, 1967  G. R. ANDERSON  3,319,639
ARTICLE ACCUMULATING AND FEEDING APPARATUS
Filed July 21, 1965  6 Sheets-Sheet 1

INVENTOR
GERALD R. ANDERSON
BY Hans G. Hoffmeister
ATTORNEY

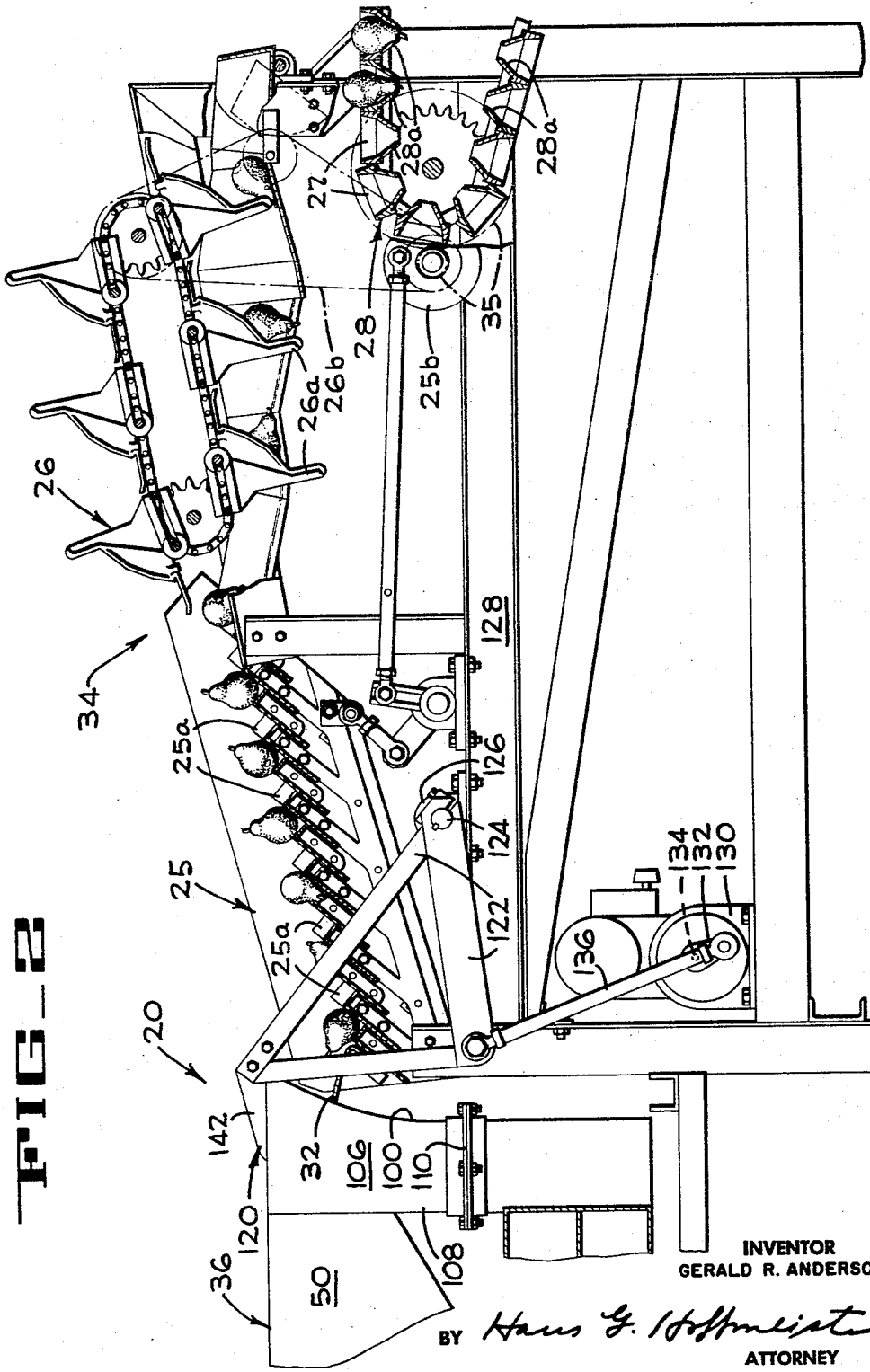

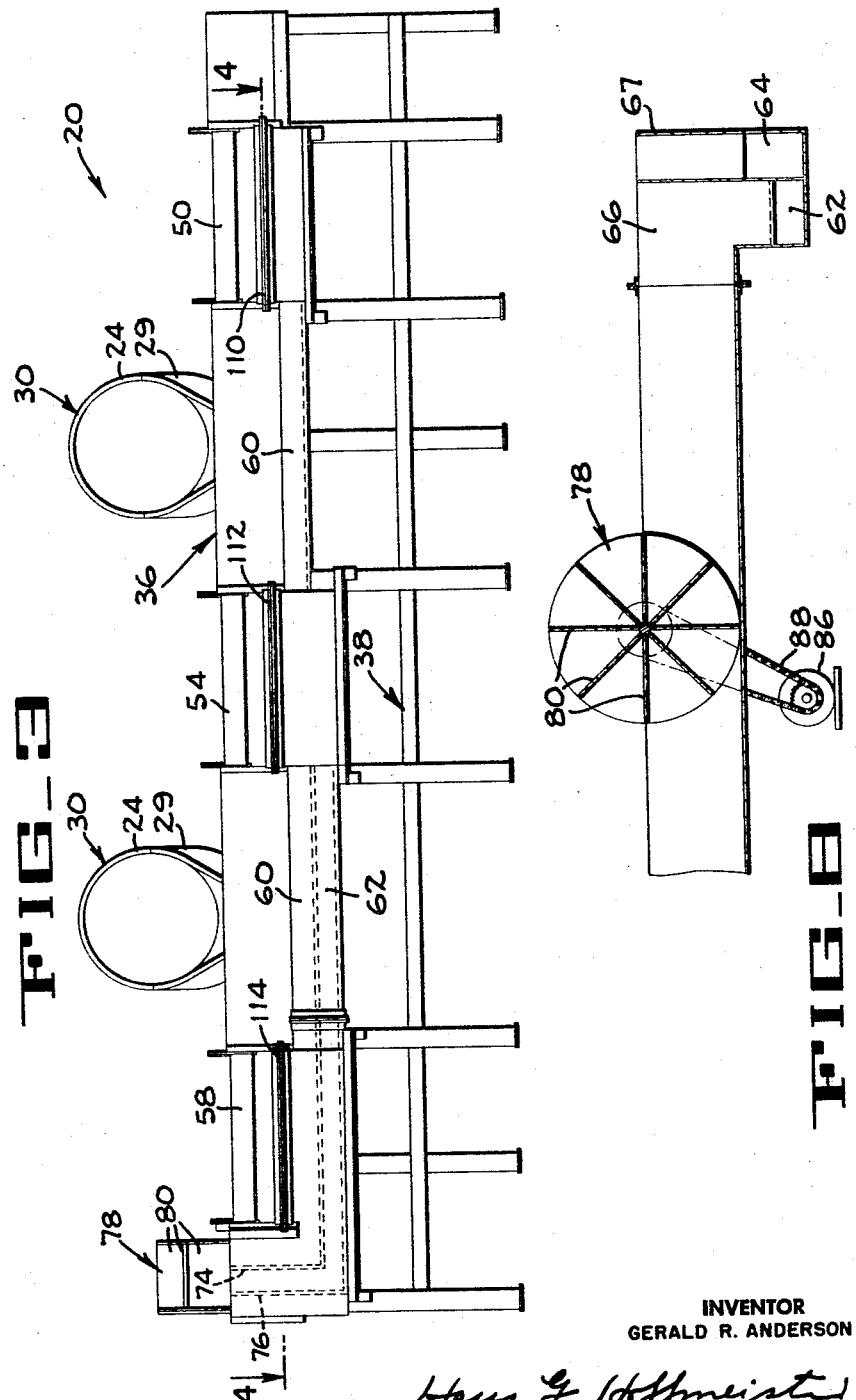

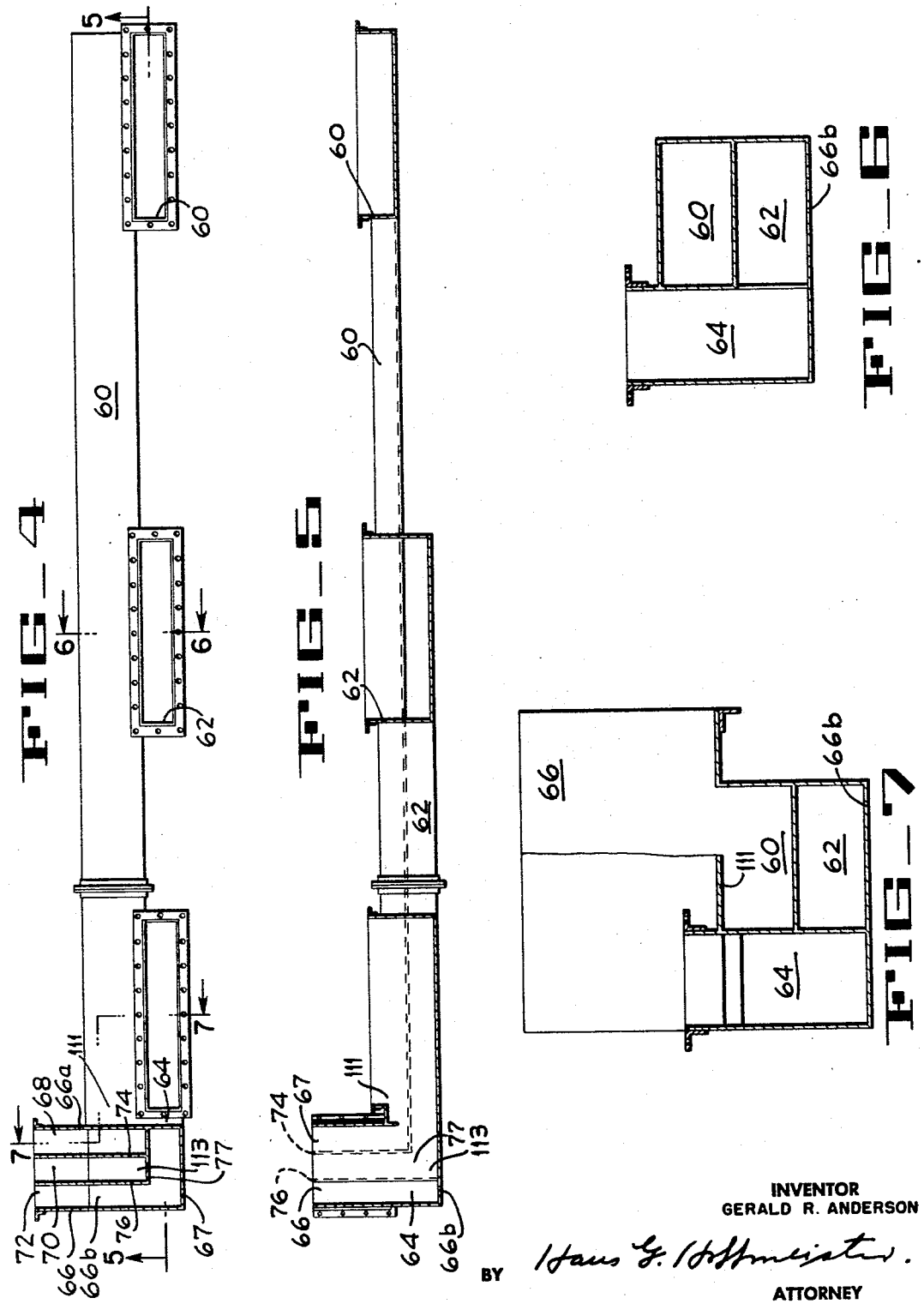

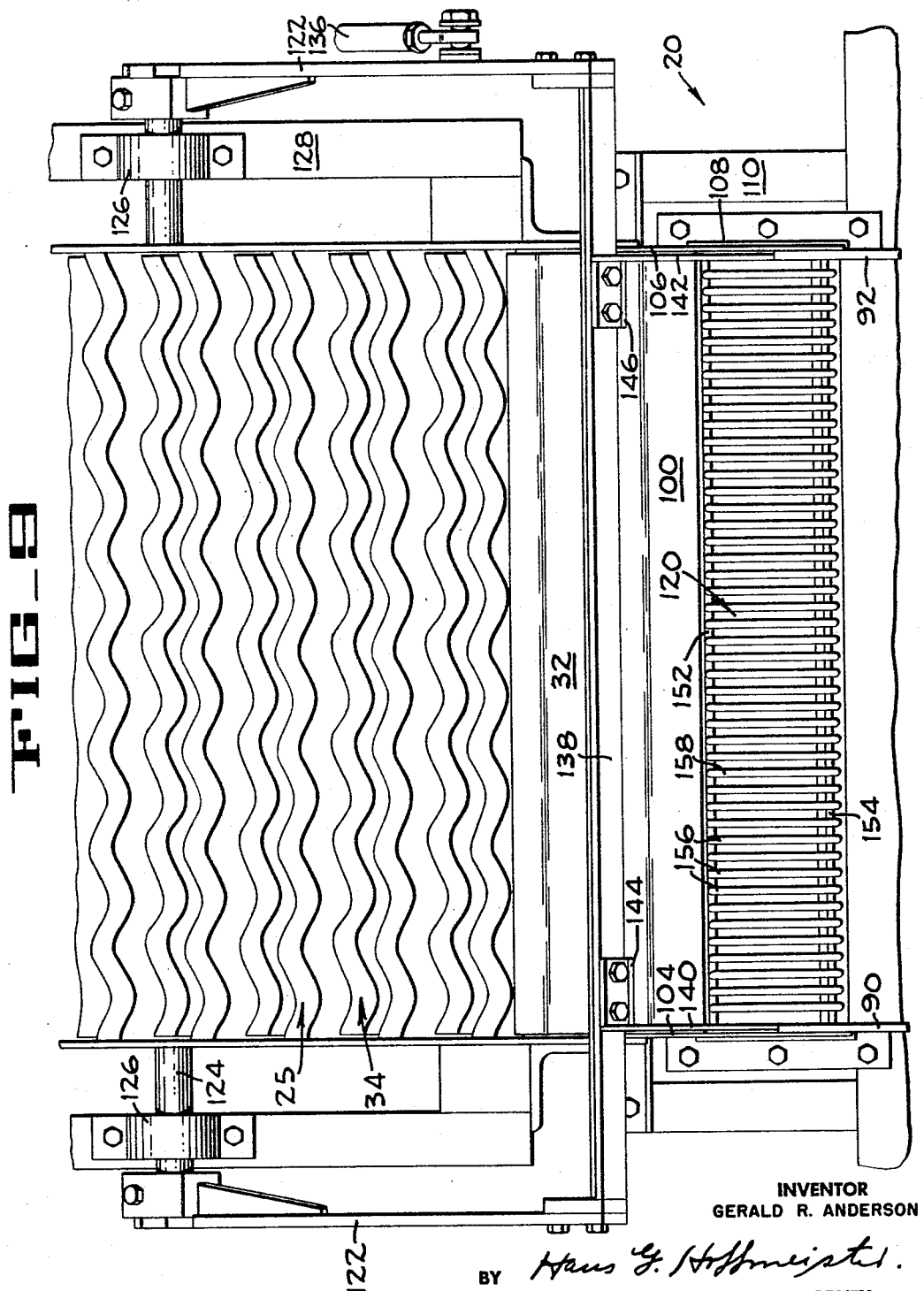

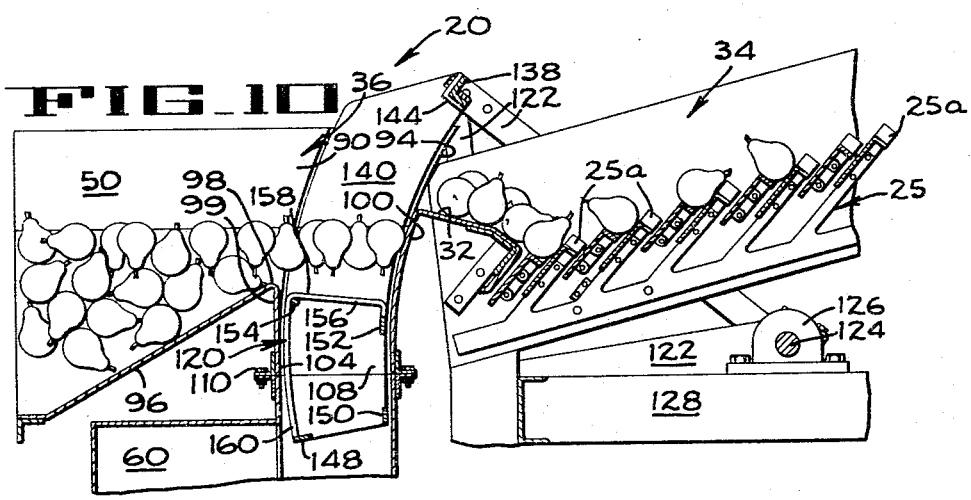
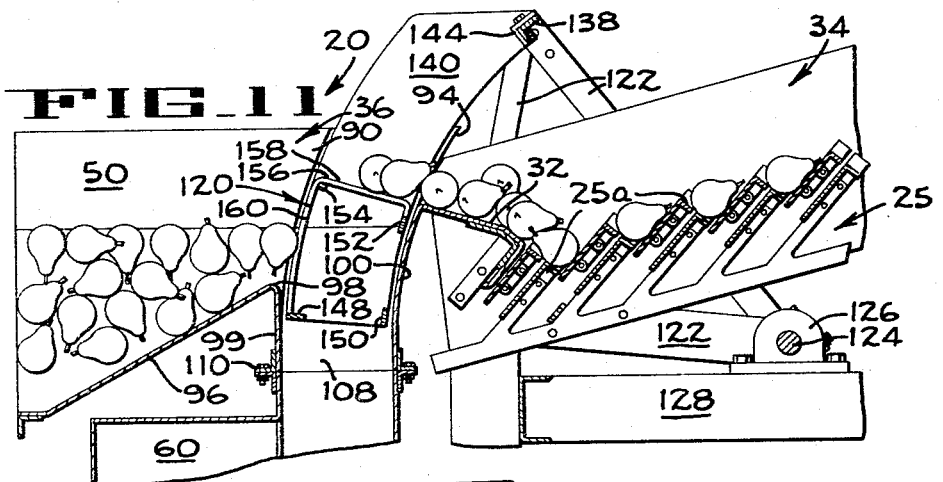
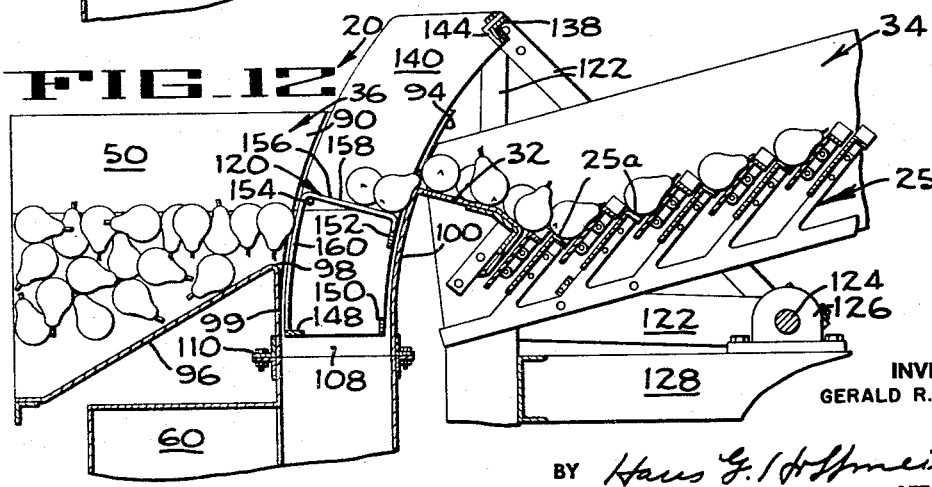

United States Patent Office 3,319,639
Patented May 16, 1967

3,319,639
ARTICLE ACCUMULATING AND FEEDING
APPARATUS
Gerald R. Anderson, Campbell, Calif., assignor to FMC Corporation, San Jose, Calif., a corporation of Delaware
Filed July 21, 1965, Ser. No. 473,785
7 Claims. (Cl. 134—134)

The present invention pertains to article accumulating and feeding apparatus and more particularly relates to a flume feeder for accumulating and feeding a random supply of articles from an inlet mechanism to a processing mechanism and having a feeding rate determined by the processing mechanism.

For most efficient operation, certain fruit processing apparatus require an adequate supply of fruit to be fed thereto from an inlet mechanism in a single layer so that the fruit, such as pears, can more reliably be oriented and individually placed in carrier pockets for subsequent stemming and coring operations.

A common difficulty which arises in known feeders of the above mentioned type is that an uneven placement of fruit in the feeder by the inlet mechanism will result, at times, in an inadequate supply of fruit being supplied to the carrier pockets so that certain pockets will be empty as they move through the processing apparatus, while at other times an excessive supply of fruit will be directed into the orienting mechanism thereby overloading the mechanism and reducing its efficiency. The orienting mechanism is especially apt to become overloaded when small fruit is fed by certain known feeders since a greater number of small fruit occupy and enter the orienting mechanism than do the larger fruit with the result that the effectiveness of the orienting operation is reduced.

Accordingly it is an object of this invention to provide a new and improved article accumulating and feeding apparatus.

Another object of the present invention is to provide an article accumulating and feeding apparatus for accumulating articles from one or more inlet mechanisms and for feeding a quantity of articles to one or more article processing mechanisms so as to cause the processing mechanisms to operate at full capacity without becoming overloaded.

Another object is to provide article feeding apparatus for gently feeding articles to processing equipment.

Another object is to provide an article feeding system arranged to accumulate articles received from an inlet mechanism, and to maintain a supply of articles in position to be fed into an article processing mechanism for acceptance thereby at a rate determined by the processing mechanism and independent of the rate of operation of the inlet mechanism.

Another object is to provide an article feeding mechanism arranged to receive articles from a number of inlet mechanisms and to feed the articles into a different number of processing mechanisms at a rate determined by each processing mechanism.

Another object is to provide an article feeding mechanism which includes a recirculating flume feeder for accumulating a supply of articles and for feeding the articles in a single layer to an article processing mechanism.

Another object is to provide a recirculating flume feeder for recirculating the liquid therein at a substantially constant rate for maintaining an accumulated supply of articles at a feeding station.

Another object is to provide a recirculating flume feeder for recirculating the liquid therein at a substantially constant rate for maintaining an accumulated supply of articles in a plurality of feeding stations.

These and other objects and advantages of the present invention will become apparent from the following description and the accompanying drawings, in which:

FIGURE 2 is a side elevation with parts cut away and other parts shown in section of a portion of the feeding apparatus and of a processing mechanism being fed by the apparatus of FIGURE 1.

FIGURE 3 is an elevation of the apparatus of FIGURE 1.

FIGURE 4 is a horizontal section taken along lines 4—4 of FIGURE 3 showing a liquid return conduit.

FIGURE 5 is a vertical section taken along lines 5—5 of FIGURE 4.

FIGURE 6 is a vertical section taken along lines 6—6 of FIGURE 4.

FIGURE 7 is a vertical section taken along lines 7—7 of FIGURE 4.

FIGURE 8 is a vertical section taken along lines 8—8 of FIGURE 1 showing certain liquid recirculating apparatus, said figures appearing on the sheet with FIGURE 3.

FIGURE 9 is an enlarged plan of an article lifter of the article accumulating and feeding apparatus and of a portion of the processing mechanism.

FIGURES 10, 11 and 12 are operational views illustrating an article lifter in different operative positions.

Figure 1:
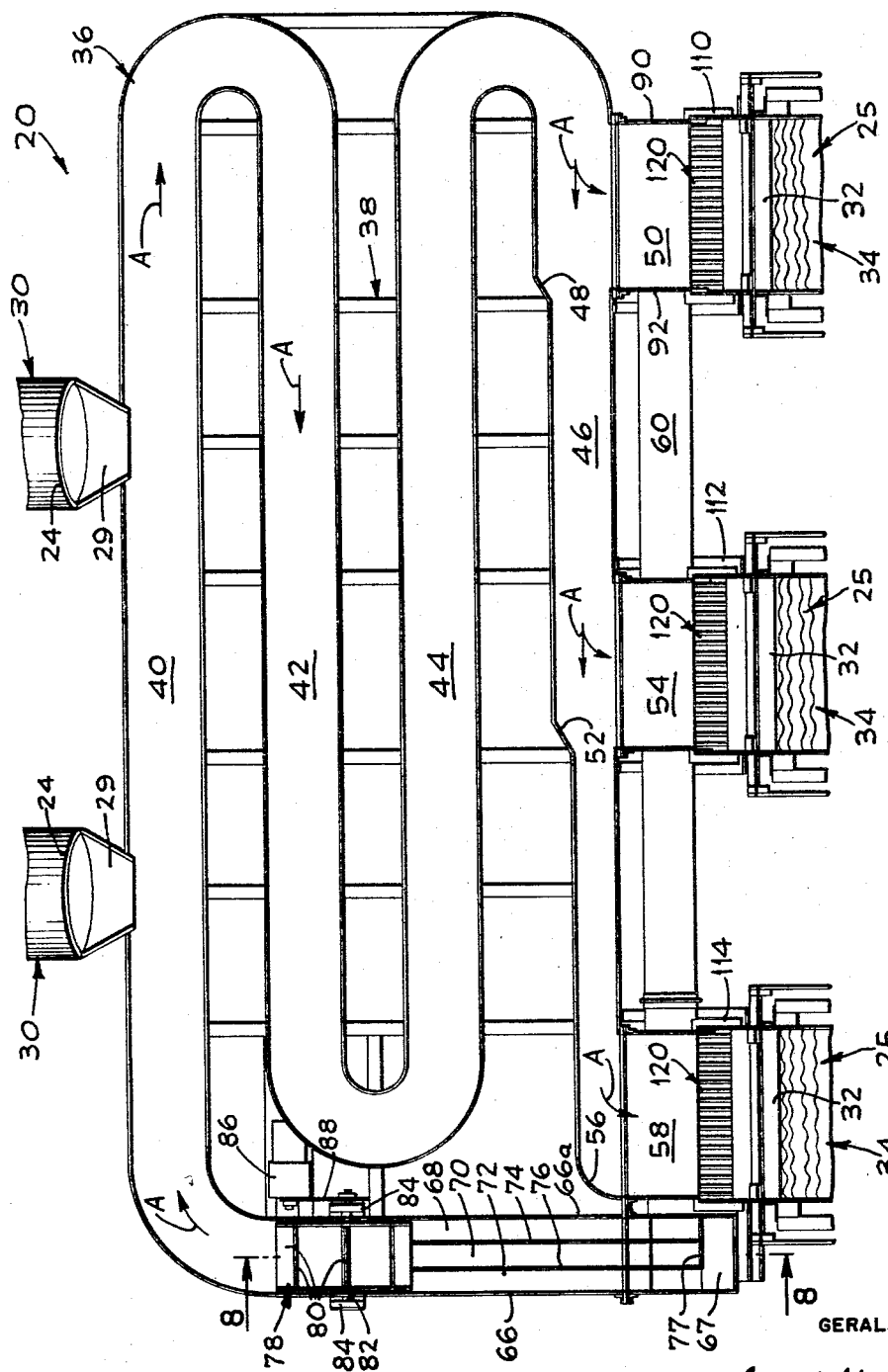
FIGURE 1 is a plan of the article accumulating and feeding apparatus of the present invention.

The article accumulating and feeding apparatus 20 (FIGS. 1 and 2) of the present invention is adapted for use with the type of apparatus disclosed in the co-pending United States patent application of Frank D. Hickey et al., Ser. No. 206,786, now Patent No. 3,246,677, filed July 2, 1962, which application is assigned to the assignee of the present invention. However, it is to be understood that the apparatus 20 may be used to accumulate and feed other types of articles to other types of apparatus.

In the above mentioned Hickey et al. apparatus, pears are first continuously moved along a predetermined path where they are lye-peeled and are subsequently washed by a rotary brush washer 24 (FIGS. 1 and 3). The lye-peeled pears are then discharged from the brush washer 24 directly into a shuffle feeder 25 (FIG. 2) which arranges the pears into a plurality of single files and discharges one pear at a time from each file in position to be engaged by a pear aligning unit 26. The aligning unit aligns and discharges each pear into an associated pocket 27 of a conveyor 28 for subsequent coring and stemming.

Although the details of the rotary brush washer 24, the shuffle feeder 25 and the pear aligning unit 26 do not form a part of the present invention, reference may be had to United States patent application of Frank D. Hickey et al., Ser. No. 206,785, now Patent No. 3,192,974, filed on July 2, 1962 for a detailed description of the washer; reference may be had to United States Patent No. 3,088,577 which issued to Chamberlin on May 7, 1963 for a detailed description of the shuffle feeder, and reference may be had to United States patent application of Anderson et al., Ser. No. 206,787, now Patent No. 3,236,-357, filed on July 2, 1962 for a detailed description of the pear aligning unit.

As illustrated in FIGURE 1, the article accumulating and feeding apparatus 20 of the present invention is positioned between the discharge chutes 29 of one or more rotary brush washers 24, which will broadly be referred to as an inlet mechanism 30, and the inlet chutes 32 of one or more shuffle feeders 25, which shuffle feeders will be broadly referred to as an article processing mechanism 34.

With regard to the processing mechanism 34 it will suffice to mention that the movable shuffles 25a (FIG. 2) of the shuffle feeder 25, the pushers 26a of the pear aligning unit 26, and the carriers 28a of the conveyor 28 are driven at a pre-determined speed from the continuously driven conveyor 28 in timed relation with each other by a chain and sprocket drive 26b, an eccentric drive 25b, and by cooperating gears 35.

The accumulating and feeding apparatus 20 (FIGS. 1 and 2) of the present invention comprises a flume 36 of a generally U-shaped construction which is supported on a frame 38. The flume includes an inlet channel 40 which receives articles from one or more of the inlet mechanisms 30, a pair of accumulating channels 42 and 44, and a distribution channel 46. In the embodiment shown in FIGURE 1, the distribution channel 46 feeds three article processing mechanisms 34 while only two inlet mechanisms 30 supply articles to the inlet channel 40.

In order to assure equal distribution of articles to each processing mechanism 34 and to assure a substantially constant water level throughout the distribution channel 46, the width of the discharge channel is reduced as at 48 downstream of a flume discharge neck 50 of the first article processing mechanism 34, and is again reduced in width as at 52 downstream of the flume discharge neck 54 of the second article processing mechanism 34. The downstream end of the distribution channel 46 is closed by a curved wall 56 to assure that all of the liquid and all of the articles in the distribution channel downstream of the second mechanism 34 will be directed into a discharge neck 58 which feeds the third article processing mechanism 34.

The flume is filled with a liquid such as salt water or fresh water which liquid advances the articles in substantially equal amounts into the flume discharge necks 50, 54 and 58. The flowing liquid discharges from each of the flume discharge necks 50, 54 and 58 into three independent conduits 60, 62 and 64 (FIGS. 1 and 4 to 7), respectively, which direct the liquid to the inlet 67 of a recirculating channel 66. The inlet 67 of the recirculating channel 66 is deeper than the other flume channels, as indicated in FIGURE 8, so as to provide for gravitational flow of the liquid into the recirculating channel. Also, the recirculating channel 66 is divided into three separate flow passages 68, 70 and 72 by baffles 74 and 76. These passages receive liquid from the conduits 60, 62 and 64, respectively. An end wall 77 is welded to the inlet ends of the baffles 74 and 76, to an inner wall 66a and the bottom wall 66b of the channel 66 in spaced relation from the inlet end 67 so as to isolate the conduit 64 from the other conduits.

In order to effect recirculation of the liquid in the flume 36, a paddle wheel 78 is positioned in the recirculating channel 66 adjacent the discharge end of the baffles 74 and 76 which baffles are curved to conform to the shape of the paddle wheel. The paddle wheel 78 includes several blades 80 secured to a shaft 82 which shaft is journalled in bearing 84 bolted to the frame 38. The paddle wheel 78 is driven by a motor 86 (FIGS. 1 and 8) that is supported by the frame 38 and is connected to the shaft 82 by a chain 88. It will be apparent that the paddle wheel 78 causes the liquid to flow in the direction of the arrows in FIGURE 1 at a rate sufficient to maintain a supply of buoyant articles at the flume discharge necks 50, 54 and 58.

When the accumulating and feeding apparatus 20 is employed in a fruit processing machine of the herein referred to type, this rate of flow is sufficient to cause the fruit to flow from the inlet channel 40 to one of the discharge necks in approximately one minute when the fruit is not blocked by other fruit in the flume 36.

Since the flume discharge necks 50, 54 and 58 are identical, the description of one neck, and the parts associated therewith, will be sufficient for all. As best illustrated in FIGURES 9–12, the neck 50 is bolted to a discharge opening of the distribution channel and comprises a pair of side walls 90 and 92 each of which terminates in an arcuate edge 94 (FIG. 10). A bottom wall 96 slopes upwardly toward an overflow edge 98 and has a skirt 99 projecting downwardly from the overflow edge 98.

An arcuate rear wall 100 having the aforementioned inclined article accommodating chute 32 on its upper end is welded to side plates 104 and 106 (FIG. 9) which form a part of the side walls 90 and 92, respectively. It will be noted that the plates 104 and 106, the skirt 99 and the arcuate rear wall 100 define a vertical overflow conduit 108 of substantially rectangular cross section. The conduit 108, which may be considered parts of the necks 50, 54 and 58, have flanges 110, 112 and 114 (FIG. 3), respectively, secured to the lower ends thereof.

As best viewed in FIGURES 3, 4 and 5, the flange 110 is bolted to the flanged inlet end of the conduit 60 which has its discharge end 111 secured to the recirculating channels 66 in flow communication with the passage 68 thereof. Similarly, the conduit 62 is bolted to the flange 112 and is connected to the channel 66 at 113 to establish communication between the neck 54 and the flow passage 70 of the recirculating channel, while the flanged end conduit 64 is bolted to the flange 114 and to the channel 66 to establish communication between the neck 58 and flow passage 72 of the recirculating channel 66. Thus, it will be noted that the paddle wheel 78, which is disposed closely adjacent the curved discharge ends of the baffles 74 and 76 (FIG. 8) in the recirculating channel 66, will tend to drain an equal amount of liquid from each of the conduits 68, 70 and 72, and thus from the necks 50, 54 and 58, resulting in a substantially equal supply of articles entering each neck 50, 54 and 58.

It will also be noted that the upward slope of the bottom wall or floor 96 (FIG. 10) in each neck will cause the rate of flow of liquid to increase as it flows over the overflow edge 98 and accordingly causes the articles in these areas to arrange themselves in a single layer rather than to remain in several layers as is the case when the articles move through the inlet channl 40, accumulating channels 42 and 44, and distribution channel 46.

In order to withdraw the articles from the necks 50, 54 and 58, each neck is provided with a reciprocal article transferring means 120 (FIGS. 2 and 9–12) which lifts those articles located in its projected area for reception by the mechanism 34. Each of the means 120 comprises a pair of spaced, generally triangular actuating arms 122 (FIGS. 2 and 9) which arms are secured to opposite ends of a pivot shaft 124 that is journalled in bearings 126 bolted to the frame 128 of the processing mechanism 34. A variable speed motor 130 (FIG. 2) is supported by the frame 128 and has a crank arm 132 secured to its output shaft 134. A link 136 is pivotally connected between the crank arm 132 and one end of one of the arms 122 thereby causing the arms to oscillate about the axis of the pivot shaft 124. An angle bar 138 extends between and is secured to the upper end of the arms 122 to provide a rigid oscillating frame.

A paid of arcuate side plates 140 and 142 are welded to short angle brackets 144 and 146 which are bolted to opposite end portions of the angle bar 138. As best shown in FIGURES 10, 11 and 12, straps 148, 150 and 152, and a rod 154 extend between and are welded to the arcuate side plates 140 and 142. A plurality of spaced rods 156 are welded to the straps 148, 150 and 152 and to the rod 154 and cooperate to define a generally horizontal article lifting grating 158 and a generally vertical article abutment grating 160. The spacing between the rods 156 is approximately three-quarters of an inch and the rods are one-quarter inch diameter material thereby permitting substantially unrestricted flow of liquid past the gratings when the lifter 120 is either in its lowermost article receiving position, as illustrated in FIGURE 10, or when the lifter 120 is in its uppermost discharge position as illustrated in FIGURE 11. Thus, the flow of liquid will be substantially unobstructed and will not cause surges or the like to occur when the lifter is reciprocated between its uppermost and lowermost position.

In the operation of the accumulating and feeding apparatus 20 of the present invention, buoyant articles are fed into the inlet channel 40 (FIG. 1) of the flume 36 by one or more inlet mechanisms 30. The liquid in the flume 36 is circulated in the direction of the arrows A in FIGURE 1 by the paddle wheels 78 causing the articles to flow into and through the accumulating channels 42 and 44 and into the distribution channel 46. The articles flow from the distribution channel into the necks 50, 54 and 58, and will accumulate behind the necks in the accumulating channels 42 and 44 and in the distribution channel 46 so as to provide a constant supply of articles at the necks 50, 54 and 58. After a sufficient supply of articles have been directed into the flume 36, the processing mechanism 34 (FIG. 2) is placed in operation and the drive motor 130 for the article lifter 120 is started thereby causing the lifter grating 158 and abutment grating 160 to oscillate about the shaft 124.

When the lifter grating 158 is in its lowermost position as illustrated in FIGURE 10, articles will flow through the associated necks 50, 54 or 58 at the speed of the liquid, caused by passage over the sloping floor 96, and becomes deposited on the lifting grating 158 in a single layer. During this time the liquid will flow through the spaces between the rod 156 and will be recirculated by the paddle wheel 78. The lifter grating 158 then elevates the articles to a discharge position shown in FIGURE 11 causing the articles to gravitate onto the chute 32 for gradual acceptance in a single layer by the shuffle feeder 25. During this time the liquid flows through the spaces between the rods 156 of the abutment grating 160 causing the articles to be continuously urged toward and against the grating 160.

If the chute 32 is filled or partially filled with articles when the lifter plate 158 reaches its uppermost position, only a sufficient number of articles to fill the chute will be discharged onto the chute 32, and the other articles will remain on the grating 158 as indicated in FIGURE 12 and will be returned into the liquid in the associated neck upon downward movement of the lifter grating 158 to its article receiving position. A sufficient number of articles will then flow onto the lifter grating 158 to again load the same with a single layer of articles prior to upward movement of the grating to its discharge position.

Thus, any excess articles on the lifter grating 158 will be returned to the liquid but will remain on the grating 158 and will be the first articles accepted by the shuffle feeder 25 during subsequent strokes of the article lifter 120. It will be apparent that the rate of movement of the article lifter 120 can be controlled by the variable speed motor 130 so that a slight excess of articles will be available to the shuffle feeder 25 at all times.

From the foregoing description, it will be apparent that the article accumulating and feeding apparatus of the present invention includes a recirculating flume which moves buoyant articles into position to be fed into a plurality of discharge stations and accumulates a sufficient supply of articles at the discharge stations to maintain processing equipment downstream of the feeder at maximum capacity at all times even though the quantity of articles entering the flume should vary. Also, the apparatus includes an article lifter which transfers a quantity of articles from the flume 36 at a rate sufficient to maintain the processing mechanisms at full capacity but insufficient to overload the mechanism.

While one embodiment of the present invention has been shown and described, it will be understood that changes and modifications may be made therein without departing from the spirit of the invention or the scope of the appended claims.

The present invention and the manner in which the same is to be used having thus been described, what is claimed as new and desired to be protected by Letters Patent is:

1. An article accumulating and feeding apparatus for receiving articles from an inlet mechanism and for feeding the articles into a processing mechanism comprising a flume for receiving articles from the inlet mechanism, means for circulating a liquid through the flume for moving the articles in one direction and for accumulating a supply of articles adjacent the processing mechanism, means in said processing mechanism defining a support surface and a reciprocating abutment surface with the reciprocating abutment surface being downstream of the support surface for periodically restraining a limited quantity of articles on said support surface, and means for periodically removing a quantity of such articles which are disposed in a single layer from said accumulated supply independent of the rate of entry of articles into said flume and for discharging only enough of the single layer of removed articles into the processing mechanism sufficient to cover said supporting surface with a single layer of articles upstream of said abutment surface to assure full capacity operation of said processing mechanism while supplying a quantity of articles insufficient to overload the processing mechanism, the articles remaining on said removing means after filling said supporting surface of the processing mechanism being returned to said accumulated supply of articles for acceptance of other articles on said removing means and upon the next periodic removing operation said returned articles being again presented to said supporting surface of the processing mechanism for acceptance thereby.

2. An article accumulating and feeding apparatus comprising a flume filled wth a liquid and having an article receiving portion and an article discharging portion, means in said flume for causing the liquid to flow through said flume, means at said article receiving portion for directing buoyant articles into the flowing liquid in said flume, means defining a liquid discharge opening at one end of said flume, an inclined floor in said flume leading into said discharge opening for decreasing the depth of liquid and accordingly increasing the rate of flow of the liquid adjacent said discharge opening, means for blocking said one end of said flume downstream of said liquid discharge opening for accumulating a supply of articles in said flume adjacent said discharge opening, article receiving means adjacent said liquid discharge opening and above the liquid level, and an article lifter in said opening including a plurality of spaced bars arranged to provide an article lifting surface and an article abutment surface, support means for supporting said bars in spaced relation permitting the liquid to pass therethrough and preventing passage of the articles therethrough, and means for oscillating said support means whereby said article lifting surface periodically lifts a single layer of articles from said flume to a position in alignment with said article receiving means such that only a portion of the articles on said lifting surface which is sufficient to fill said article receiving means is discharged onto said article receiving means.

3. An article accumulating and feeding apparatus comprising a flume filled with a liquid and having an article receiving portion and an article discharging portion, a paddle wheel in said flume, means for driving said paddle wheel for causing the liquid to flow through said flume, means at said article receiving portion for directing buoyant articles into the flowing liquid in said flume, means defining a liquid discharge opening at one end of said flume, an inclined floor in said flume leading into said discharge opening for decreasing the depth of liquid and accordingly increasing the rate of flow of the liquid adjacent said discharge opening, means for blocking said one end of said flume downstream of said liquid discharge opening for accumulating a supply of articles in said flume adjacent said discharge opening, article receiving means adjacent said liquid discharge opening and above the liquid level, an article lifter in said opening, said lifter including a plurality of spaced bars arranged to provide an article lifting surface and an article abutment surface, support means for supporting said bars in spaced relation permitting the liquid to pass therethrough and preventing passage of the articles therethrough, and means for vertically oscillating said support means whereby said article lifting surface periodically lifts a single layer of articles from said flume to a position in alignment with said article receiving means so that only a portion of the articles on said lifting surface which is sufficient to fill said article receiving means is discharged onto said article receiving means.

4. An article accumulating and feeding apparatus comprising a flume filled with a liquid and having an article receiving portion and a plurality of article discharging portions, a driven paddle wheel in said flume for circulating the liquid therein, means at said article receiving portion for directing buoyant articles into the flowing liquid in said flume, means defining a plurality of liquid discharge openings with one opening being disposed adjacent each discharge portion, means for reducing the width of said flume downstream of each opening so as to maintain substantially the same rate of movement of the liquid upstream and downstream of the openings, means outwardly of each opening for terminating the movement of articles and for accumulating a plurality of the articles adjacent each opening, inclined floors in said flume leading into each opening for increasing the velocity of liquid entering said openings thereby reducing the depth of accumulated articles adjacent said openings, article receiving means adjacent each of said liquid discharge openings and disposed above the liquid level, and independent means for lifting a quantity of articles from said flume above each opening and for discharging only that portion of the articles from said lifting means which is sufficient to fill said associated article receiving means, each of said lifting means including the perforated grating for permitting flow of liquid therepast and through said association discharge opening nad for blocking the movement of articles therepast.

5. An article accumulating and feeding apparatus comprising a flume filled with a liquid and having an article receiving portion and a plurality of article discharging portions, a driven paddle wheel in said flume for circulating the liquid therein, means at said article receiving portion for directing buoyant articles into the flowing liquid in said flume, means defining a plurality of liquid discharge openings with one opening being disposed adjacent each discharging portion, means for reducing the width of said flume downstream of each opening so as to maintain substantially the same rate of movement of the liquid upstream and downstream of the openings, means outwardly of each opening for terminating the movement of the articles and for accumulating a plurality of the articles adjacent each opening, inclined floors in said flume leading into each opening for increasing the velocity of liquid entering said openings thereby reducing the depth of accumulated articles adjacent said openings, article receiving means adjacent each of said liquid discharge openings and disposed above the liquid level, independent means for lifting a quantity of articles from said flume above each opening and for discharging only that portion of the articles from said lifting means which is sufficient to fill said associated article receiving means, each of said lifting means including a perforated abutment plate for permitting flow of liquid through said associated discharge opening and for blocking the movement of articles therepast, means in said flume downstream of said paddle wheel for dividing the portion of said flume immediately adjacent said paddle wheel into a plurality of channels equal in number to said plurality of openings, and a plurality of independent conduits, each conduit connecting one of said openings to one of said channels whereby said paddle wheel will create an equal drawing force on each of said channels causing the flow of liquid into each opening to be equal to that flowing into the other openings.

6. An article accumulating and feeding apparatus comprising a flume filled with a liquid and having an article receiving portion and a plurality of article discharging portions, a driven paddle wheel in said flume for circulating the liquid therein, means at said article receiving portion for directing buoyant articles into the flowing liquid in said flume, means defining a plurality of liquid discharge openings with one opening being disposed adjacent each discharge portion, means for reducing the width of said flume downstream of each opening so as to maintain substantially the same rate of movement of the liquid upstream and downstream of the openings, means outwardly of each opening or terminating the movement of the articles and for accumulating a plurality of the articles adjacent each opening, inclined floors in said flume leading into each opening for reducing the depth of accumulated articles adjacent said openings, article receiving means adjacent each of said liquid discharge openings and disposed above the liquid level, an article lifter in each opening, each article lifter including a plurality of spaced bars arranged to provide an article lifting surface and an article abutment surface, support means for supporting said bars in spaced relation permitting the liquid to pass therethrough and to prevent passage of the articles therethrough, and means for oscillating each of said support means whereby each of said article lifting surfaces periodically lifts a single layer of articles from said flume to a position in alignment with said associated article receiving means and wherein only that portion of articles on said lifting surface which is needed to fill said associated article receiving means is discharged onto said article receiving means.

7. An article accumulating and feeding apparatus comprising a flume filled with a liquid and having an article receiving portion and a plurality of article discharging portions, a driven paddle wheel in said flume for circulating the liquid therein, means at said article receiving portion for directing buoyant articles into the flowing liquid in said flume, means defining a plurality of liquid discharge openings with one opening being disposed adjacent each discharge portion, means for reducing the width of said flume downstream of each opening so as to maintain substantially the same rate of movement of the liquid upstream and downstream of the openings, means outwardly of each opening for terminating the movement of the articles and for accumulating a plurality of the articles adjacent to each opening, inclined floors in said flume leading into each opening for increasing the velocity of liquid entering said openings thereby reducing the depth of accumulated articles adjacent said openings, article receiving means adjacent each of said liquid discharge openings and disposed above the liquid level, an article lifter in each opening, each article lifter including a plurality of spaced bars arranged to provide an article lifting surface and an article abutment surface, support means for supporting said bars in spaced relation permitting the liquid to pass therethrough and blocking the movement of articles therepast, means for vertically oscillating each of said support means whereby each of said article lifting surfaces periodically lifts a single layer of articles from said flume to a position in alignment with said associated article receiving means and wherein only that portion of the articles on said lifting surface which is sufficient to fill said associated article receiving means is discharged onto said article receiving means, means in said flume downstream of said paddle wheel for dividing the portion of said flume immediately adjacent said paddle wheel into a plurality of channels equal in number to said plurality of openings, and a plurality of independent conduits, each conduit connecting one of said openings to one of said channels whereby said paddle wheel will create an equal drawing force on each of said channels causing the flow of liquid into each opening to be substantially equal to that flowing into each of the other openings.

References Cited by the Examiner

UNITED STATES PATENTS

| | | | |
|---|---|---|---|
| 2,143,838 | 1/1939 | Boettger | 134—134 X |
| 2,752,926 | 7/1956 | James | 134—133 |
| 3,058,616 | 10/1962 | Loveland et al. | 198—30 X |

CHARLES A. WILLMUTH, *Primary Examiner.*

R. L. BLEUTGE, *Assistant Examiner.*